(12) United States Patent
Dodson et al.

(10) Patent No.: US 10,986,110 B2
(45) Date of Patent: *Apr. 20, 2021

(54) ANOMALY AND CAUSATION DETECTION IN COMPUTING ENVIRONMENTS USING COUNTERFACTUAL PROCESSING

(71) Applicant: Elasticsearch B.V., Mountain View, CA (US)

(72) Inventors: Stephen Dodson, London (GB); Thomas Veasey, York (GB)

(73) Assignee: Elasticsearch B.V., Amsterdam (NL)

( * ) Notice: Subject to any disclaimer, the term of this patent is extended or adjusted under 35 U.S.C. 154(b) by 561 days.

This patent is subject to a terminal disclaimer.

(21) Appl. No.: 15/498,406

(22) Filed: Apr. 26, 2017

(65) Prior Publication Data
US 2018/0314965 A1    Nov. 1, 2018

(51) Int. Cl.
*G06N 20/00*    (2019.01)
*H04L 29/06*    (2006.01)

(52) U.S. Cl.
CPC ......... *H04L 63/1425* (2013.01); *G06N 20/00* (2019.01); *H04L 2463/121* (2013.01)

(58) Field of Classification Search
CPC ................ G06N 20/00; H04L 63/1425; H04L 2463/121
See application file for complete search history.

(56) References Cited

U.S. PATENT DOCUMENTS 9,038,172 B2    5/2015 Miller et al.
9,224,067 B1    12/2015 Lu et al.
(Continued)

FOREIGN PATENT DOCUMENTS

WO    WO2012154657 A2    11/2012
WO    WO2018200111 A1    11/2018
(Continued)

OTHER PUBLICATIONS

"International Search Report" and "Written Opinion of the International Searching Authority," Patent Cooperation Treaty Application No. PCT/US2018/024613, dated Jun. 1, 2018, 10 pages.
(Continued)

*Primary Examiner* — Kamran Afshar
*Assistant Examiner* — Imad Kassim
(74) *Attorney, Agent, or Firm* — Carr & Ferrell LLP (57) ABSTRACT

Anomaly and causation detection in computing environments are disclosed. An example method includes receiving an input stream of data instances for a time series, each of the data instances being time stamped and including at least one principle value and a set of categorical attributes; generating anomaly scores for each of the data instances over continuous time intervals; detecting a change in the anomaly scores over the continuous time intervals for the data instances; and identifying which of the set of categorical attributes of the data instances caused the change in the anomaly scores using a counterfactual analysis. The counterfactual analysis may comprise removing a portion of the data instances; regenerating the anomaly scores for each of the remaining data instances over the continuous time intervals; and if the anomaly scores are improved, identifying the portion as a cause of anomalous activity. Recommendations to remediate the cause may be generated.

17 Claims, 5 Drawing Sheets

(56) References Cited

U.S. PATENT DOCUMENTS

| | | | |
|---|---|---|---|
| 9,516,053 | B1 | 12/2016 | Sudhakar et al. |
| 2006/0167917 | A1 | 7/2006 | Solomon |
| 2008/0114725 | A1 | 5/2008 | Indeck et al. |
| 2009/0077663 | A1 | 3/2009 | Sun et al. |
| 2012/0137367 | A1 | 5/2012 | Dupont et al. |
| 2013/0238476 | A1 | 9/2013 | Green |
| 2013/0325584 | A1* | 12/2013 | Bogaty .............. G06Q 30/0242 705/14.41 |
| 2013/0326620 | A1 | 12/2013 | Merza et al. |
| 2015/0047026 | A1 | 2/2015 | Neil et al. |
| 2015/0058982 | A1 | 2/2015 | Eskin et al. |
| 2015/0082437 | A1 | 3/2015 | Dodson |
| 2015/0180894 | A1 | 6/2015 | Sadovsky et al. |
| 2016/0055654 | A1* | 2/2016 | Flanders ................... G06T 7/11 382/162 |
| 2016/0142435 | A1* | 5/2016 | Bernstein ............ H04L 63/1441 726/23 |
| 2016/0226901 | A1 | 8/2016 | Baikalov et al. |
| 2017/0063910 | A1 | 3/2017 | Muddu et al. |
| 2018/0314835 | A1 | 11/2018 | Dodson et al. |
| 2018/0316707 | A1 | 11/2018 | Dodson et al. |

FOREIGN PATENT DOCUMENTS

| | | |
|---|---|---|
| WO | WO2018200112 A1 | 11/2018 |
| WO | WO2018200113 A1 | 11/2018 |

OTHER PUBLICATIONS

"International Search Report" and "Written Opinion of the International Searching Authority," Patent Cooperation Treaty Application No. PCT/US2018/024660, dated Jun. 26, 2018, 9 pages.

Domingues, Remi, "Machine Learning for Unsupervised Fraud Detection," Royal Institute of Technology, School of Computer Scienece and Communication, KTH CSC, SE-100 44 Stockholm, Sweden, 2015 [retrieved on May 21, 2018], Retrieved from the Internet: <URL:http://www.diva-portal.org/smash/get/diva2:897808/FULLTEXT01.pdf>, 66 pages.

"International Search Report" and "Written Opinion of the International Searching Authority," Patent Cooperation Treaty Application No. PCT/US2018/024671, dated Jul. 27, 2018, 15 pages.

Chandola, Varun et al., "Anomaly Detection: A Survey," ACM Computing Surveys, Aug. 15, 2007, pp. 1-72, Retrieved from the Internet: <URL:http://www.cs.umn.edu/sites/cs.umn.edu/files/tech_reports/07-017.pdf>.

"Extended European Search Report", European Patent Application 18790780.3, dated Sep. 10, 2020, 6 pages.

Soule et al., "Combining Filtering and Statistical Methods for Anomaly Detection", USENIX, The Advanced Computing Systems Association, Oct. 24, 2005, pp. 1-14.

"Extended European Search Report", European Patent Application 18791513.7, dated Sep. 14, 2020, 9 pages.

Domingues et al., "Machine Learning for Unsupervised Fraud Detection", Stockholm, Sweden 2015, Kth Royal Institute of Technology School of Computer Science and Communication, Second Cycle (Year: 2015), 66 pages.

Riveiro et al., "Improving maritime anomaly detection and situation awareness through interactive visualization", IEEE Xplore, Sep. 26, 2008, 8 pages.

\* cited by examiner

ANOMALY AND CAUSATION DETECTION IN COMPUTING ENVIRONMENTS USING COUNTERFACTUAL PROCESSING

FIELD OF THE PRESENT TECHNOLOGY

The present technology relates generally to digital security, and more particularly, but not by limitation, to systems and methods that detect anomalies in computing environments that are indicative of malicious or otherwise unwanted behavior within, or performed by, the computing environment. This anomaly detection process is enhanced using methodologies for detecting and isolating sources of the anomalies.

SUMMARY

Various embodiments of the present technology include a method for detecting anomalous activity in a computing environment, the method comprising: (a) receiving an input stream of data instances for a time series, where the data instances in the input stream are time stamped, each of the data instances comprising at least one principal value and a set of categorical attributes; (b) generating anomaly scores for each of the data instances over continuous time intervals; (c) detecting a change in the anomaly scores over the continuous time intervals for the data instances; and (d) identifying which of the set of categorical attributes of the data instances caused the change in the anomaly scores using a counterfactual analysis.

In various embodiments, the generating of the anomaly scores may comprise creating features for a current group of the data instances; applying an anomaly detection algorithm that takes as inputs (a) the features for the current group and (b) group features calculated using set functions for groups earlier than the current group; and generating the anomaly scores, the anomaly scores being indicative of how anomalous are the features for the current group.

Various embodiments of the present technology include a method for detecting anomalous activity in a computing environment, the method comprising: (a) receiving an input stream of data instances for a time series, where the data instances in the input stream are time stamped; (b) separating the data instances into at least one principal value and a set of categorical attributes; (c) grouping the data instances into groups based on continuous time intervals, each of the continuous time intervals having a length; (d) applying set functions to each of the groups; (e) generating an anomaly score for each of the groups using the set functions; and (f) applying any of a counterfactual analysis and a regularity analysis to identify which of the set of categorical attributes for a group is influencing the one or more anomalies in the groups that are indicative of the anomalous activity in the computing environment.

Some embodiments of the present technology further include enacting changes in the computing environment relative to at least a portion of the categorical attributes to prevent future instances of the anomalous activity.

Various embodiments of the present technology include a system for detecting anomalous activity in a computing environment, the system comprising: (a) a processor; and (b) a memory for storing executable instructions, the processor executing the instructions to perform an unsupervised machine learning method that comprises: (1) generating anomaly scores for data instances of an input stream received over continuous time intervals; (2) detecting a change in the anomaly scores over the continuous time intervals for the data instances; and (3) identifying which of a set of categorical attributes of the data instances caused the anomaly scores using a counterfactual analysis.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

The present disclosure is directed to various embodiments of systems and methods that use unsupervised machine learning to detect anomalous activity and isolate a source or sources thereof. In more detail, an input stream of data instances is received. The input stream can include data instances of behavior or activity of a computer environment. Generally, a computer environment can include an individual computing system as well as a plurality of computers or other computing devices such as a network. The input stream can be obtained from any method that would be known to one skilled in the art.

In various embodiments, the data instances are obtained over a period of time and each of the data instances are time stamped. Various analyses described herein examine the data instances over all or a portion of the period of time for which the input stream is collected. Anomalies can be detected within this input stream by examining and comparing principal values (or at least one principal value) and their corresponding categorical attributes as they changed over time. These changes are identified as anomalies, according to various embodiments. Further inspection of the anomalies may confirm or eliminate the anomalies as indicative of malicious behavior or other computing environment issues.

In accordance with various embodiments of the present disclosure, when an anomaly is detected, a cause or causes of the anomaly are located through a process of counterfactual processing. An exemplary process of counterfactual processing uses reductionism and elimination to isolate principal values and/or corresponding categorical attributes that contribute to the anomaly. In various embodiments, these anomalous principal values and/or corresponding categorical attributes are then traced back to a source such as a user, a computing system, a network component, or the like (generally referred to as a source point). This source point can then be identified and flagged for further review. In some embodiments, the source point is automatically remediated. For example, if the source point is a computing system and the anomaly that is detected is a spike in traffic between the computing system and a foreign server, the remediation can comprise automatically blocking network access for the computing system until a full review of the computing system has been conducted.

These and other advantages of the present technology are provided below with reference to the collective drawings.

Figure 1:
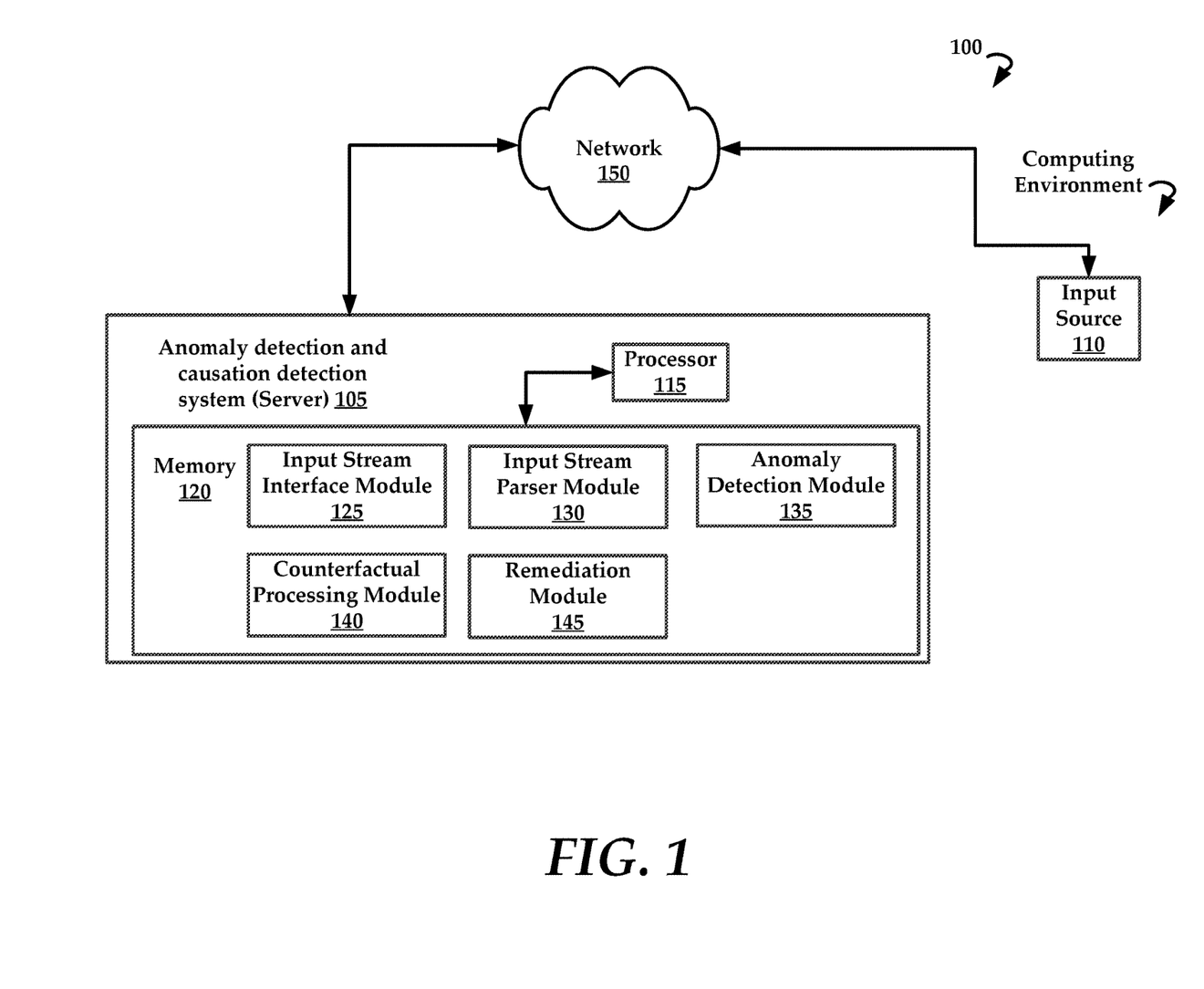
FIG. 1 is a high level schematic diagram of computing architecture for practicing aspects of the present technology.

FIG. 1 is a high level schematic diagram of an exemplary computing architecture (hereinafter architecture 100) of the present technology. The exemplary architecture 100 comprises an exemplary anomaly detection and causation detection system 105 (hereinafter also referred to as exemplary system 105 or system 105 for short), which in some embodiments comprises a server or cloud-based computing device configured specifically to perform the analyses described herein. That is, the system 105 in some embodiments is a particular purpose computing device that is specifically designed and programmed (e.g., configured or adapted) to perform any of the methods described herein. The system 105 can also comprise a plurality of distributed computing systems that cooperatively provide the features of the system 105. For example, individual ones of the plurality of distributed computing systems can provide one or more unique functions or services. In some embodiments, the system 105 can comprise a cloud computing environment or other similar networked computing system.

The system 105 can be coupled with an input source 110 that provides an input stream to the system 105. An input source 110 can comprise, for example, a computing system, an enterprise network, a plurality of computing systems arranged as a network, virtual machines, application(s), network tap(s), services, a cloud, containers, or other similar computing environment that creates data instances. In some embodiments, the input source 110 comprises a database or data store that stores pre-obtained data from any of the aforementioned sources for use in accordance with the present disclosure.

In one embodiment, the system 105 comprises a processor 115 and memory 120 for storing instructions. The memory 120 can include an input stream interface module 125, an input stream parser module 130, an anomaly detection module 135, a counterfactual processing module 140, and a remediation module 145. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

In some embodiments, the system 105 receives an input stream from the input source 110 via the input stream interface module 125. An input stream may include a plurality of data instances that are collected over a period of time. The individual data instances (or components thereof) may be time stamped so that a chronological order can be maintained for the data instances.

In some embodiments, using unsupervised machine learning, the exemplary system 105 can evaluate the data instances over time to detect anomalous behavior. In general, anomalous behavior can include any deviation in the data instances as viewed over time. For example, if the data instances are collected for a network such as a cloud, changes in resource utilization of a service within the cloud can be identified as anomalous. In another example, a brief spike in file transfer rates between a computing device and another computing device (possibly in a foreign country) can be flagged as anomalous. The present disclosure is not intended to be limited to unsupervised machine learning and in some embodiments can incorporate other machine learning methods. In one embodiment, user feedback can be incorporated into an anomaly score via supervised machine learning techniques, or at least partially supervised or a mixture that is based on how unusual the deviation/anomaly is relative to models of historical behavior of the system 105, as well as how it compares to other anomaly instances that have been indicated as important.

The use of unsupervised machine learning in various embodiments allows the system 105 to evaluate only the data instances available and examine these data instances for anomalous behavior in a self-referential manner. That is, in various embodiments, the data instances are modeled for the time period for which data instances are collected and these data instances are used without referencing pre-generated behavior profiles or other similar profiles. The use of pre-generated behavior profiles may be advantageous in some embodiments, if available, but these profiles are not required.

Changes in data instances over time can be flagged as anomalous if the changes have a magnitude that is unexpected. The exemplary system 105 need not rely on rigid thresholds or rules for determining if changes in the data instances are anomalous, but such information can be used to confirm or validate the anomaly. In some embodiments, the system 105 can calculate a probability of a current behavior based on historical behavior, where low probability events are classified as anomalies. Again, the use of thresholds or rules is not required, but is also not prohibited.

In various embodiments, each data instance is comprised of at least one principal value that represents an aspect or object of the computing environment that is to be measured for anomalies. Non-limiting examples of principal values include network traffic volume, memory access and/or usage, processor usage rates, file transfer, file access, device access, and so forth. In various embodiments, the at least one principal values selected can be a subset of all available principal values in the data instances. The principal values selected for the data instances can be user-selected or user-defined, or can be based on prior knowledge, such as prior instances of anomalous network activity. For example, if prior anomalies in increased CPU usage in a cloud were linked to malicious behavior, the principal values could include CPU usage aspects.

In other embodiments, the data instances can be selected based on pre-defined understanding of the data type, or automatically by the system 105 based on data characteristics.

In some embodiments, a principal value comprises corresponding categorical attributes and values thereof. In one example, if the principal value is "log on time", categorical attributes could include users, system ID, login locations, and so forth.

When the input stream is received, the exemplary input stream parser module 130, shown in the example in FIG. 1, may be executed to separate or parse the input stream into data instances that are ordered in time. That is, in various embodiments, the data instances are collected over a period of time and time stamped as noted above. The input stream parser module 130 can determine the influence that instances of the collected data have on the computing environment using the principal values v (or at least one principal value) and corresponding set of categorical attributes $[a_j^i]$. In various embodiments, the input stream parser module 130 considers the data as a collection $\{d_i=(v_i, a_i^1, a_i^2, \ldots, a_i^n)\}$, where data represented by { } includes a set. Again, using the example above, a principal value v is log on time and two categorical attributes $a_j^1 \in \{jim, jill, greg\}$, which are indicative of users and $a_j^2 \in \{home, work\}$, which are indicative of a location. Additional or fewer categorical attributes can be considered. In various embodiments, the input stream parser module 130 converts the principal value and categorical attributes into a collection of sets (8:50 am, jim, work); (7:40 am, jill, work); and (6:45 pm greg, home). Other similar tuples can be created for other types of data sets, and can include a combination of numerical and/or non-numerical values.

In some embodiments, anomaly influence aims to understand the way that the categorical attributes are influencing the anomalies that are located by analyzing the principal value v.

Anomaly detection as disclosed in various embodiments herein involves the comparison and evaluation of the at least one principal value changing over time. According to some embodiments, once sets are created from the data instances, the anomaly detection module 135 is executed to detect anomalies for the data: $\mathcal{D} = \{(t_i, d_i)\}$.

In various embodiments, the anomaly detection module 135 creates features in order to perform anomaly detection by bucketing (e.g., grouping) the data instances into continuous time intervals, where a kth bucket or group is defined according to the equation: $\mathcal{B}_k = \{(t_i, d_i) \in \mathcal{D} : t_i \geq kL, t_i < (k+1)L\}$ where L is a bucket length (e.g., time frame or portion of total time for which data instances were collected).

The anomaly detection module 135 then applies one or more set functions $f: \mathbb{R} \to \mathcal{U}$ where $\mathcal{U} \subset \{v_i : (t_i, (v_i, \dots)) \in \mathcal{D}\}$ to generate a set of features. The value of a feature for the kth bucket is thus $f(\mathcal{B}_k)$. In one example, if $v_i$ are numerical, the set function is a mean that is calculated using: $f = 1/|\mathcal{U}| \Sigma_u v_i$; whereas if $v_i$ are categorical, the set function selected is a count $f = |\mathcal{U}|$; and alternatively if $v_i$ are categorical, the set function is a distinct count $f = |\{[v_i]\}|$, where [*] denotes its arguments equivalence class. Thus, the principal value can include any of numerical values, categorical values, combinations thereof, or other similar principal value types that would be known to one of ordinary skill in the art with the present disclosure before them. Examples of a numerical principal values as provided above would include 8:50 (am), 100 (gigabits of data), 30 (memory access operations), 80% (CPU usage), and so forth. Examples of categorical principal values include names, locations, or other non-numerical data.

The anomaly detection module 135, in the above example, then applies a suitable anomaly detection algorithm to the bucketed data instances.

In various embodiments, the suitable anomaly detection algorithm will take as inputs bucket features $\{f(\mathcal{B}_i)\}$ for buckets chronologically earlier in time than a current bucket j, i.e., for i<j, and then generate an anomaly score which corresponds to how anomalous is the value $f(\mathcal{B}_j)$ for the current bucket j. The operation for the exemplary algorithm can be expressed as $(f(\mathcal{B}_j), \{f(\mathcal{B}_i) : i < j\}) \mapsto s$ where s is the anomaly score.

In various embodiments, an exemplary anomaly detection algorithm tries to predict a distribution for a new feature value based on relevant historical data and the time the feature value occurs. The exemplary anomaly detection algorithm can account for multiple effects, such as slowly changing level, periodic patterns, weekday/weekend differences and recurrent patterns that relate to the calendar. For example, if a prediction is being made for 10 am on Monday morning, the anomaly distribution algorithm will estimate the probability distribution of values for the feature based on historical behavior for Monday mornings around that time and may also account for differences between days of the month or Mondays of the month. In some embodiments, a test is made to check if there is a statistically significant over occurrence of large predictions errors which coincide with a particular calendar feature. For example, it is expected on average there to be "n"×"p"/100 "p" percentile prediction errors given "n" predictions. Furthermore, (assuming independence), this must follow a binomial distribution. Therefore, the exemplary algorithm can calculate the chance of seeing a given count (or higher) of large prediction errors for a particular day of month, day of week and week of month, say the 2nd Monday of each month, and so on. In various embodiments, if this chance is small then it is typically appropriate to estimate a correction to the predicted distribution which depends on this feature, i.e., correct the predictions with information about previous of the same type of calendar day.

In order to understand what the impact of one of the categorical attributes is on an anomaly, it is noted that the distinct values of the attribute create a partition of the data instances in the bucket, i.e., the data instances for which the ith categorical attribute is $a_j^i$ is an equivalence class defined by:

$[a_j^i]_k = \{(t_i, d_i) \in \mathcal{B}_k : d_i = (v_i, a^{*1}, \dots, a_j^i, \dots, a^{*n})\}$. For example, $a^{*1}$ denotes any value from the set of possible values for the first type of categorical attribute. Examples of the type of categorical attribute include user and location.

Using the aforementioned algorithms and the separation of data instances by their categorical attributes, the exemplary counterfactual processing module 140 may selectively remove portions of the data instances corresponding to each categorical attribute, recalculate the anomaly scores, and determine if removal of the categorical attributes reduces or removes the anomaly. If removal does reduce or remove the anomaly, it can be determined that the object of the computing environment responsible for producing the removed categorical attributes is likely a source (could be one of many) for the anomaly. This process, in various embodiments, does not categorize the detection of an anomaly as a malicious or nefarious event, but instead detects the anomaly and flags associated portions of the computing environment for further consideration or review.

In various embodiments, the counterfactual processing module 140 can provide a mechanism for asking and answering questions such as, for example, what would the situation be like if all the data labelled with a given attribute were removed, or what would it be like if all the data except that labelled with a given attribute were removed.

In various embodiments, these counterfactual processing can be executed very efficiently depending on the function. For example, to do this process for a mean (e.g., numerical principal value) the system 105 is not required to store all the data in a bucket, but only additionally maintain a count and mean of values for each distinct value of each categorical attribute. Specifically, for each equivalence class we need $$|[a_j^i]_k| \text{ and } 1/|[a_j^i]_k| \sum_{(t_i, d_i) \in [a_j^i]_k} v_i.$$

This counterfactual approach for understanding causation, according to various embodiments, falls under logical principles of "if B does not happen, C does not happen" and thus "B causes C" by logical extension. Specifically, for certain types of set functions (e.g., countably additive functions) it is understood that the attribute $a_j^i$ influences an anomaly for the bucket $\mathcal{B}_k$ if the output of the anomaly detection algorithm (e.g., a score of the bucket), is that the bucket is less anomalous in the alternative world in which the only thing that changed is that all the data instances labeled with $a_j^i$ are removed. Stated another way, various embodiments ask whether the anomaly scores are lower when a portion of the data instances with specific categorical attributes are removed and the remaining data instances are rescored. If yes, the specific categorical attributes whose data instances were removed likely contributed to the discrepant anomaly score.

In general, counterfactual reasoning agrees with knowledge available for countably additive functions like count or sum. For example, if it is observed first that the count is unusually high, and then observed that, if a particular category had not occurred, the count is normal. In this example, it seems reasonable to conclude that the "behavior" of that particular category caused the anomalous score.

For other types of set functions, for example, where the presence of a single example data instance can cause an anomaly of a similar score, then the system 105 may use a regularity approach for understanding causation (i.e. "B causes C" if "whenever B occurs C occurs"). More specifically, it is known that the categorical attribute $a_j^i$ influences an anomaly score of a bucket $\mathcal{B}_k$ if the output of an anomaly detection algorithm (i.e., score of the bucket) is roughly the same in all alternative worlds (such as removing any subset of the data instances which are not labeled with $a_j^i$) in which all the data instances labeled $a_j^i$ exist (e.g., whenever B occurred, C also occurred).

Examples of such set functions include determining maximum or minimum values of the principal values in the bucket, i.e., max $\{v_i:(t_i,(v_i,\ldots))\in\mathcal{B}_k\}$ and min $\{v_i: (t_i, (v_i,\ldots))\in\mathcal{B}_k\}$. For example, the system 105 may determine that a bucket minimum is unusually low and that the bucket minimum coincides with a particular categorical attribute. In that case, it seems reasonable to conclude that the "behavior" of that categorical attribute caused the anomalously low score in this example.

These exemplary processes above can be generally referred to as a process for creating and using a behavioral profile of a computing environment. In various embodiments, the behaviors of the computing environment are assessed for anomalous activity/behaviors.

Once an anomaly has been detected and a cause or causes isolated, the remediation module 145 may be executed to remediate the cause or causes in some embodiments. In various embodiments, the specific methods by which the remediation module 145 remediates a cause are highly dependent upon the type of anomaly detected. For example, if the anomaly includes a high rate of access to a particular database, the remediation module 145 may restrict access privileges for the database until the anomaly is reviewed. If the anomaly is unusually frequent file transfers (e.g., exfiltration) of high volumes of data outside a protected network, the remediation module 145 may restrict file transfers by specifically identified machines in the network. This could occur through changing firewall policies or preventing access to any external network by the machines.

In sum, the present disclosure provides various embodiments of systems and methods to detect anomalies within computing environments and deduce the cause or causes of those anomalies. The systems and methods can detect unusual events, rates, metrics and so forth for any computing environment. In some embodiments, multiple anomalies can be present and detected by the systems and methods herein. For example, the systems and methods can detect both exfiltration of data and excessive login attempts.

Figure 2:
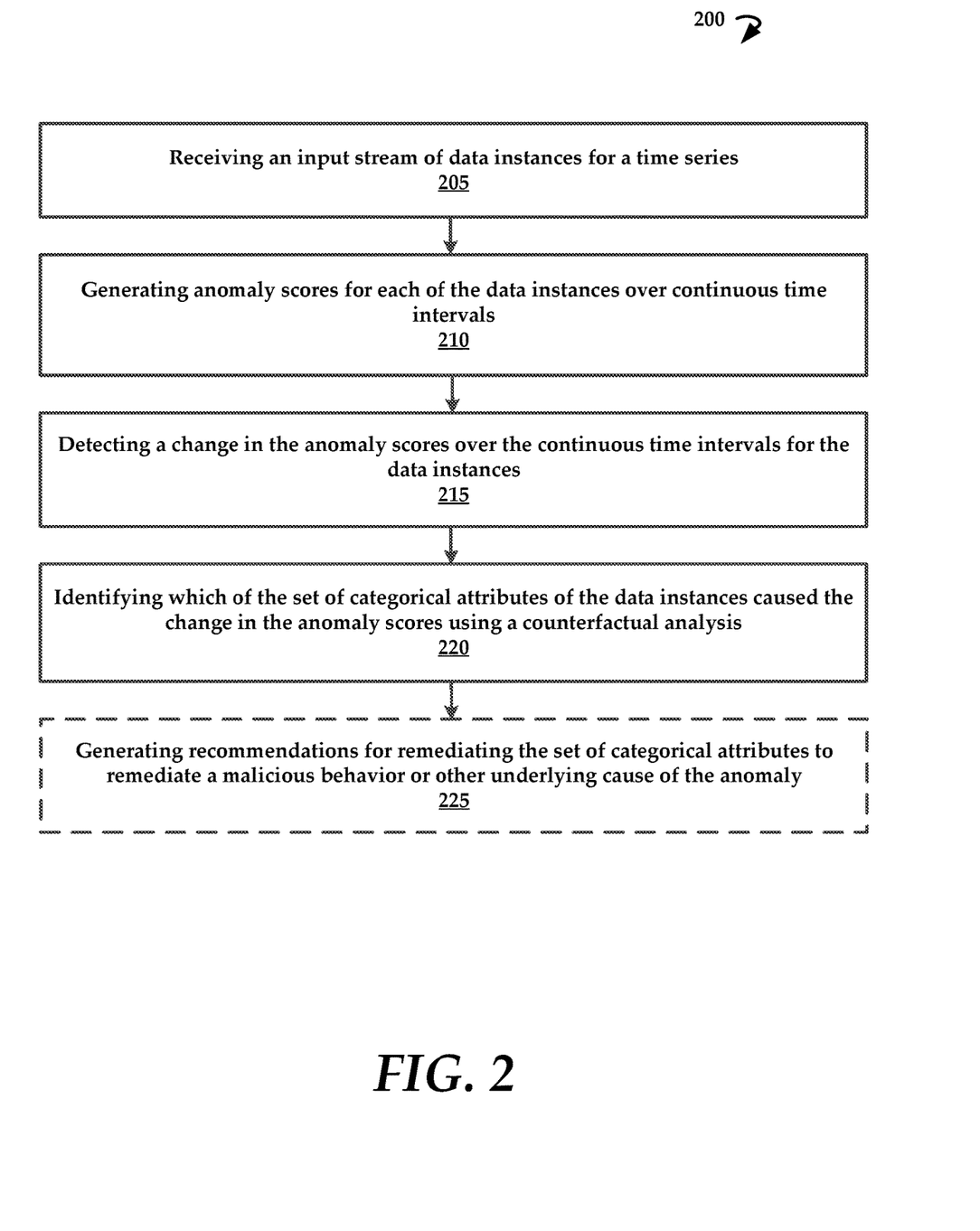
FIG. 2 is a flowchart of an example method for detecting anomalous activity in a computing environment and determining a cause(s) thereof.

FIG. 2 is a flowchart of an example method 200 of detecting anomalous activity in a computing environment and determining one or more causes for the anomalous activity. The example method 200 comprises a step 205 of receiving an input stream of data instances for a time series. For example, an input stream can be received from a computing environment. The time series can include any span of time desired. The method includes evaluating the input stream that includes data that spans over a period of time. The example method 200 can involve using unsupervised machine learning, inasmuch as the data utilized is that which is included in the input stream only. That is, the entirety of the analysis, in some embodiments, involves the input stream without using pre-determined or pre-configured metrics for assessing the data instances of the input stream.

In some embodiments, the data instances of the input stream are time stamped. The data instances also comprise at least one principal value, and each principal value comprises a set of categorical attributes.

After the input stream is received, the example method 200 includes a step 210 of generating anomaly scores for each of the data instances over continuous time intervals. That is, the data instances may be scored in a chronological manner such that anomaly scores along the timeline are calculated. The example method 200 then includes a step 215 of detecting a change in the anomaly scores over the continuous time intervals for the data instances. Stated otherwise, the example method 200 examines the scores calculated for the buckets of data instances (as described above) and locates variances in the scores that are indicative of an anomaly. In some embodiments, the user can specify how much scores can deviate over time before the deviations are flagged as an anomaly. For example, if the principal value is network traffic volume, and the network traffic volume rates change only slightly (e.g., +/−5%), these discrepancies in network traffic volume are not anomalous, whereas a change of more than 10% may be flagged as anomalous.

In various embodiments, an anomaly score is a normalized measure of how big the deviation is, and the larger the score the more unusual the deviation. In some embodiments, the system 105 characterizes historical deviations using a density function, i.e., a chance f(x) of seeing a deviation x in the value of the set function. The anomaly score, in some embodiments, is related to the chance of seeing a deviation which is at least as unlikely, i.e. the total chance of seeing any value y for which f(y)<f(x). A fixed cutoff on the anomaly score can be utilized, i.e., an anomaly is something which should occur rarely based on historical data, so has a score greater than a fixed threshold. The score may therefore amount to a dynamic threshold since it is based on the data characteristics. In various embodiments, the system 105 separately and precisely controls the rate at which the system 105 generate alerts at a specific severity based on the anomaly score, i.e., the system 105 does not allow this to exceed (over a very long time frame, although it can exceed it for shorter time frames) more than a certain value. Higher severity alerts are allowed less frequently, according to some embodiments.

Figure 3:
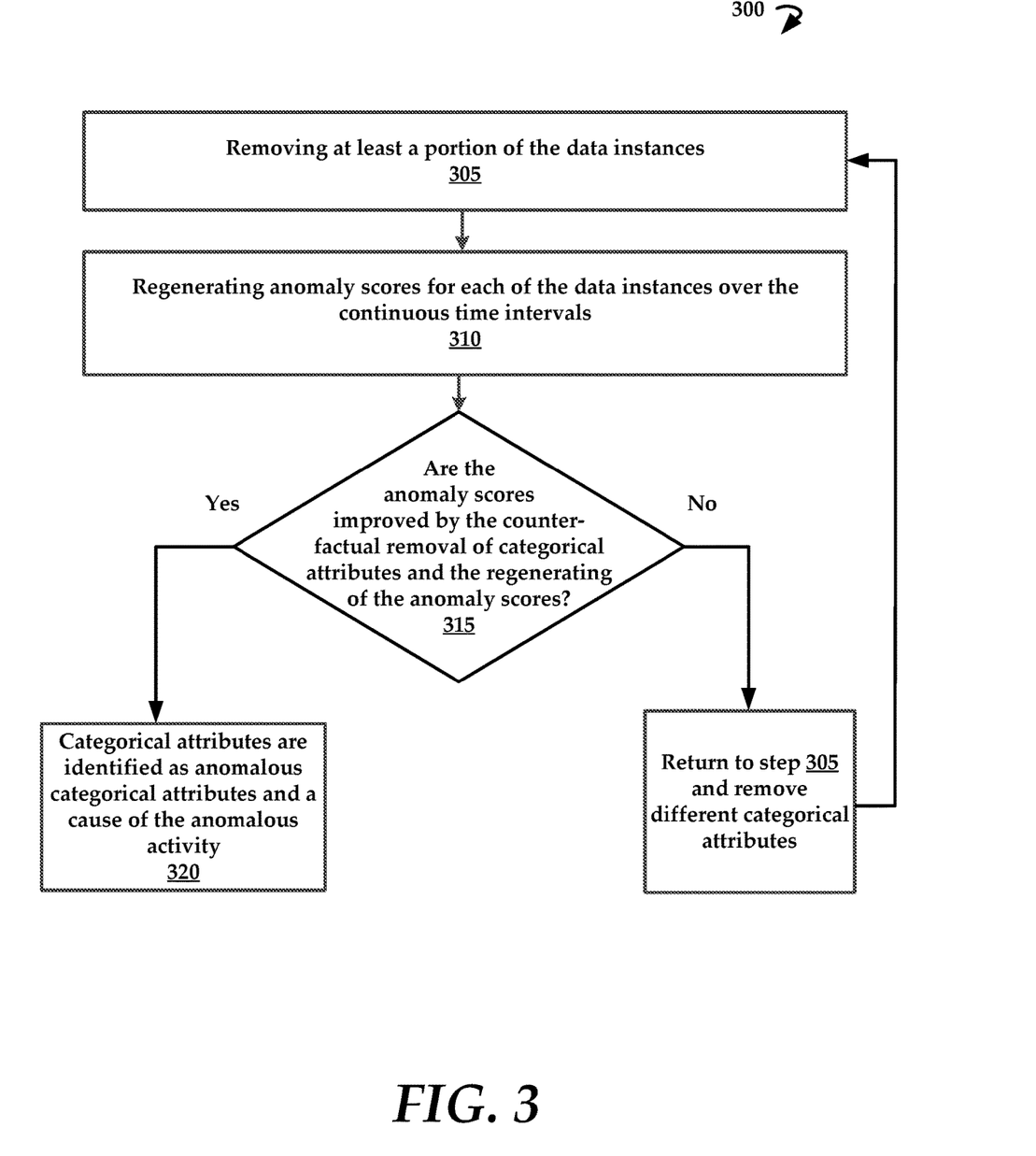
FIG. 3 is a flowchart of an example method of counterfactual analysis for determining a cause or causes of an anomalous activity.

The example method 200 includes a step 220 of identifying which of the set of categorical attributes of the data instances caused the change in the anomaly scores using a counterfactual analysis. FIG. 3 illustrates an example method 300 of counterfactual analysis.

In some embodiments, the example method 200 can include an optional step 225 of generating recommendations for remediating the set of categorical attributes to remediate a malicious behavior or other underlying cause of the anomaly. For example, the system can suggest that users not be allowed to log in from remote locations if categorical attributes indicate that users are logging in after permissible log in hours when remote. In another example, the system can suggest that all devices that are used to access a particular database use a higher level of authentication in response to detecting anomalous activity (e.g., high level of access requests) with respect to the database.

FIG. 3 is a flowchart of an example method 300 of counterfactual analysis, which is an example embodiment of the identifying step 220 in FIG. 2. The example method 300 comprises a step 305 of removing at least a portion of the data instances. For example, data instances associated with a device on a network can be removed. Next, the example method 300 includes a step 310 of regenerating anomaly scores for each of the data instances over the continuous time intervals. Next, a determination is made in step 315 if the regenerated anomaly scores are improved (e.g., by the removal that used "counterfactual" processing) compared to the anomaly scores. If the anomaly scores are improved (e.g., variances in anomaly scores are removed and the anomaly scores are substantially consistent with one another), then at least a portion of the categorical attributes are identified as anomalous categorical attributes and a cause of the anomalous activity in step 320 of the example in FIG. 3. Stated otherwise, an improvement in an anomaly store is a lower score (e.g., the deviation is less unusual), according to various embodiments.

If the anomaly scores are not improved, the example method 300 returns to step 305 and a second portion of the categorical attributes are removed and steps 310 and 315 are repeated. This process may continue until a cause or causes of an anomaly are determined. In various embodiments, the system 105 allows for multiple causes of an anomaly, i.e. it is possible that two distinct categorical attributes both contribute to the anomaly, and the system 105 will report each cause. The system 105 can order the attributes in such a way that testing can terminate when the system 105 locates an attribute which doesn't "cause" an anomaly. The system 105 can compute a positive score for how influential a categorical attribute is, with zero meaning not influential at all.

The counterfactual processing, in various embodiments, e.g., as used in step 220 and method 300, comprises efficiently subtracting components from a behavioral profile (e.g., analysis of the input stream) until the component contributing to the unusual behavior is isolated and located.

In some embodiments, the systems and methods can utilize a regularity analysis rather than a counterfactual analysis. In various embodiments, the regularity analysis comprises identifying when a specific categorical attribute of the set of categorical attributes influences the anomaly score for the data instances if an output of an anomaly detection algorithm is approximately identical for alternative cases in which all the data instances with that specific categorical attribute exist.

Figure 4:
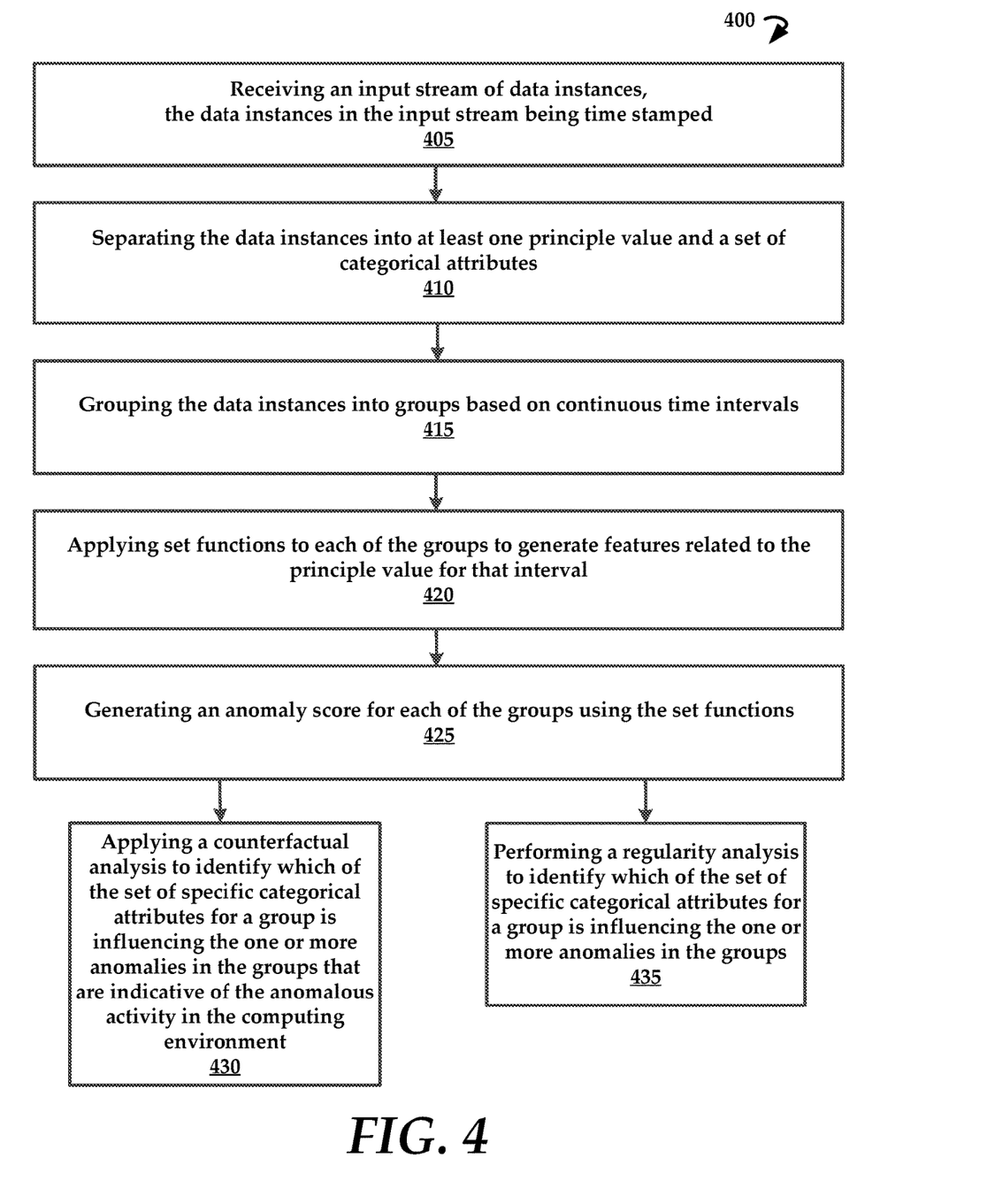
FIG. 4 is a flowchart of another example method of anomaly and causation detection.

FIG. 4 is a flowchart of another example method, example method 400, of anomaly and causation detection according to various embodiments. The example method 400 includes a step 405 of receiving an input stream of data instances. In various embodiments, the data instances in the input stream are time stamped. The example method 400 includes a step 410 of separating the data instances into at least one principal value and a set of categorical attributes, as well as a step 415 of grouping the data instances into groups based on continuous time intervals. It will be understood that, in various embodiments, each of the continuous time intervals has a length that represents a duration of the interval.

Next, the example method 400 includes a step 420 of applying set functions to each of the groups to generate features related to the principal value for that interval, and a step 425 of generating an anomaly score for each of the groups using an anomaly detection algorithm.

In some embodiments, the example method 400 comprises either (or both) a step 430 of applying a counterfactual analysis to identify which of the set of specific categorical attributes for a group is influencing the one or more anomalies in the groups that are indicative of the anomalous activity in the computing environment; or a step 435 of performing a regularity analysis to identify which of the set of specific categorical attributes for a group is influencing the one or more anomalies in the groups.

Figure 5:
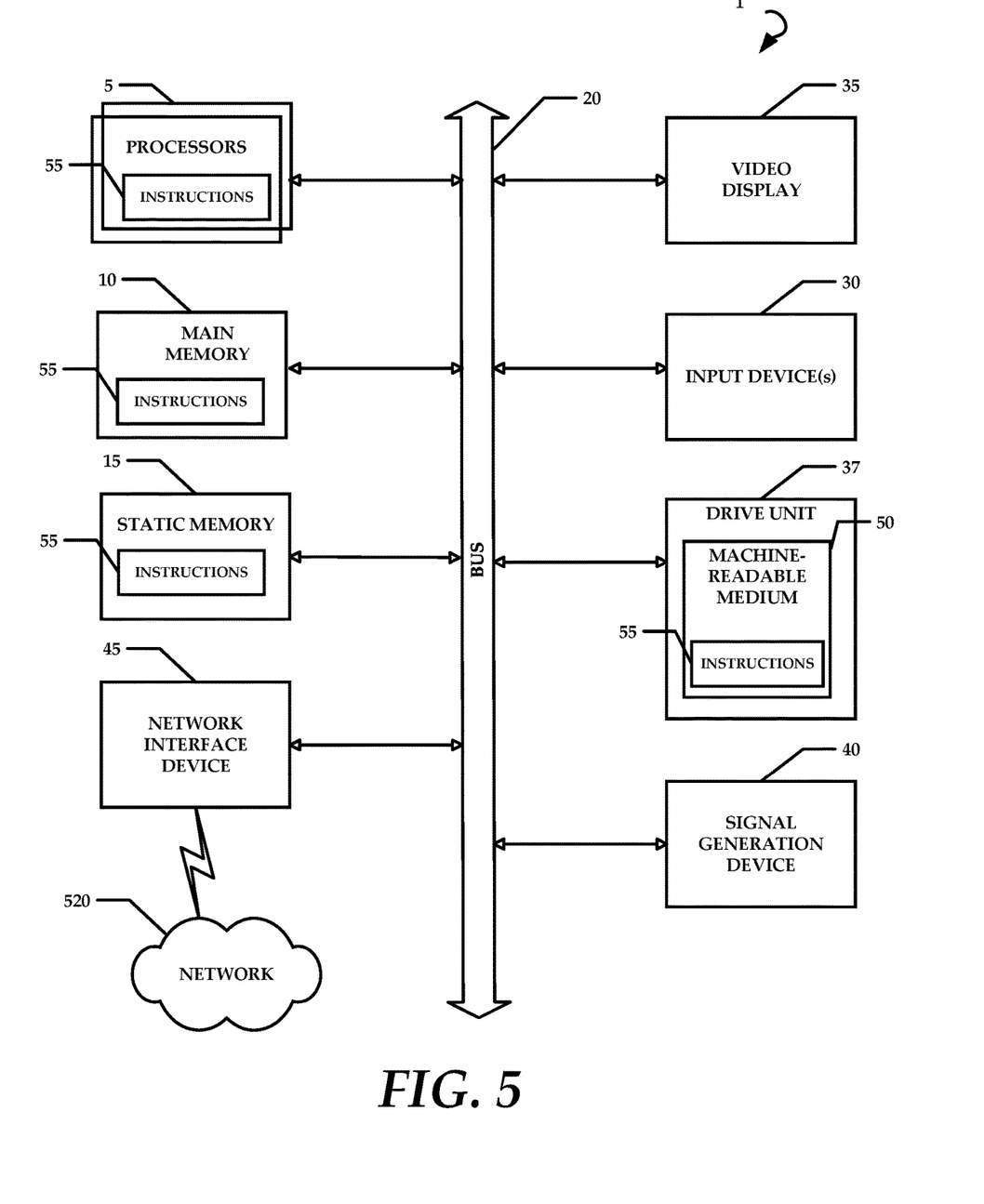
FIG. 5 is a schematic diagram of a computing system that is used to implement embodiments according to the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 150 or network 520, see FIG. 1 and FIG. 5, respectively) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for detecting anomalous activity in a computing environment, the method comprising:
    receiving an input stream of data instances obtained from a computing environment, for a time series, where the data instances in the input stream are time stamped to create a chronological order of the data instances, each of the data instances comprising at least one principal value and a set of categorical attributes;
    generating anomaly scores for each of the data instances over continuous time intervals, the anomaly scores being indicative of malicious activity or other deleterious computing environment issues within the computing environment;
    detecting a change in the anomaly scores over the continuous time intervals for the data instances as compared to the anomaly scores for the data instances standing earlier in the chronological order; and
    identifying which of the set of categorical attributes of the data instances caused the change in the anomaly scores using a counterfactual analysis, the counterfactual analysis comprising:
    removing at least a portion of the data instances;
    regenerating the anomaly scores for each of the data instances over the continuous time intervals; and
    wherein if the regenerated anomaly scores are improved compared to the anomaly scores, at least a portion of the set of categorical attributes are identified as anomalous categorical attributes and a cause of the anomalous activity.

2. The method of claim 1, wherein the change in the anomaly scores is indicative of malicious behavior in the computing environment.

3. The method of claim 2, further comprising generating recommendations for remediating the set of categorical attributes to remediate the malicious behavior.

4. The method of claim 1, wherein the set of categorical attributes comprises a tuple created from at least two categorical attributes.

5. The method of claim 1, further comprising grouping the data instances into groups based on the continuous time intervals, each of the groups having a time length for its corresponding continuous time interval.

6. The method of claim 1, wherein the at least one principal value is categorical or numerical.

7. The method of claim 6, wherein, for the numerical principal value, a set function is applied to calculate a mean value.

8. The method of claim 6, wherein, for the categorical principal value, a set function is applied to calculate any of an equivalence class count or a distinct count.

9. The method of claim 1, wherein generating the anomaly scores comprises:
    creating features for a current group of the data instances;
    applying an anomaly detection algorithm that takes as inputs the features for the current group, and group features calculated using set functions for groups earlier than the current group; and
    generating the anomaly scores, the anomaly scores being indicative of how anomalous are the features for the current group.

10. The method of claim 1, further comprising enacting changes in the computing environment relative to at least a portion of the set of categorical attributes to prevent future instances of the anomalous activity.

11. A method for detecting anomalous activity in a computing environment, the method comprising:
   receiving an input stream of data instances obtained from a computing environment, the data instances in the input stream being time stamped to create a chronological order of the data instances;
   separating the data instances into at least one principal value and a set of categorical attributes;
   grouping the data instances into groups based on continuous time intervals, each of the continuous time intervals having a length;
   applying set functions to each of the groups;
   generating an anomaly score for each of the groups using the set functions, the anomaly score being indicative of malicious activity or other deleterious computing environment issues within the computing environment; and
   applying a counterfactual analysis or a regularity analysis to identify which of the set of categorical attributes for a group causes a change in the anomaly score for the group as compared to the anomaly score for the groups standing earlier in the chronological order and is influencing one or more anomalies in the groups that are indicative of the anomalous activity in the computing environment, wherein the counterfactual analysis comprises:
      determining a change in the anomaly score;
      removing at least a portion of the data instances, the at least a portion of the data instances being associated with one or more categorical attributes of the set of categorical attributes identified as influencing the one or more anomalies;
      regenerating the anomaly score for each of the data instances which remain after the removing; and
      comparing the regenerated anomaly score to the anomaly score to identify if at least a portion of the categorical attributes caused the change in the anomaly score.

12. The method of claim 11, further comprising remediating the computing environment to remedy the anomalous activity.

13. The method of claim 11, wherein generating the anomaly score further comprises applying an anomaly detection algorithm to values generated using the set functions to detect changes in the groups over the continuous time intervals.

14. The method of claim 11, wherein the regularity analysis further comprises identifying when a categorical attribute of the set of categorical attributes influences the anomaly score for the set of categorical attributes if an output of an anomaly detection algorithm is substantially identical to alternative instances in which the set of categorical attributes exists.

15. A system for detecting anomalous activity in a computing environment, comprising:
   a processor; and
   a memory for storing executable instructions, the processor executing the instructions to perform an unsupervised machine learning method that comprises:
      generating anomaly scores for data instances of an input stream obtained from a computing environment and received over continuous time intervals;
      detecting a change in the anomaly scores over the continuous time intervals for the data instances as compared to the anomaly scores for the data instances standing earlier in a chronological order of the data instances, the anomaly scores being indicative of malicious activity or other deleterious computing environment issues within the computing environment; and
   identifying which of a set of categorical attributes of the data instances caused the anomaly scores using a counterfactual analysis or a regularity analysis, wherein the counterfactual analysis comprises:
   removing at least a portion of the data instances;
   regenerating the anomaly scores for each of the data instances, that remained after the removing, over the continuous time intervals; and
   wherein if the regenerated anomaly scores are improved compared to the anomaly scores, at least a portion of the set of categorical attributes are identified as anomalous categorical attributes and a cause of the anomalous activity.

16. The system of claim 15, wherein the data instances correspond to selected features to be analyzed for anomalous behavior.

17. The system of claim 15, further comprising remediating the computing environment to remedy the anomalous activity associated with anomalous behavior.

* * * * *